(12) United States Patent
Takata

(10) Patent No.: US 7,254,735 B2
(45) Date of Patent: Aug. 7, 2007

(54) DATA PROCESSING SYSTEM WITH BLOCK CONTROL CIRCUITS USING SELF-SYNCHRONIZATION HANDSHAKING AND LOCAL CLOCK/POWER CONTROL BASED ON DETECTED COMPLETION WITHIN SUBBLOCKS

(75) Inventor: Hidehiro Takata, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 306 days.

(21) Appl. No.: 10/672,640

(22) Filed: Sep. 26, 2003

(65) Prior Publication Data

US 2004/0215994 A1 Oct. 28, 2004

(30) Foreign Application Priority Data

Apr. 22, 2003 (JP) .............................. 2003-116716

(51) Int. Cl.
*G06F 1/12* (2006.01)
(52) U.S. Cl. ...................... 713/400; 711/169; 713/324
(58) Field of Classification Search ................ 713/400, 713/324; 711/169
See application file for complete search history.

(56) References Cited

U.S. PATENT DOCUMENTS

| 5,920,899 A | * | 7/1999 | Chu ........................... 711/169 |
| 6,369,614 B1 | * | 4/2002 | Ridgway ...................... 326/93 |
| 6,961,863 B2 | * | 11/2005 | Davies et al. ................ 713/500 |

OTHER PUBLICATIONS

Brian Curran, et al., "A 1.1 GHz First 64b Generation Z900 Microprocessor" 2001 IEEE International Solid-State Circuits Conference, ISSCC 2001/SESSION 15/ MICROPROCESSORS/ 15.5, pp. 238-239 & 454.

Hidehiro Takata, et al., "Physical Design Methodology for On-Chip 64-Mb DRAM MPEG-2 Encoding with a Multimedia Processor", IEICE Transactions on Electronics, vol. E85-C, No. 2, Feb. 2002, pp. 368-374.

Kouichi Yamguchi, et al., "2.5 GHz 4-phase Clock Generator with Scalable and No Feedback Loop Architecture" 2001 IEEE International Solid-State Circuits Conference, ISSCC 2001/SESSION 25/Clock Generation and Distribution/25.4, pp. 398-399 & 326-327.

Thucydides Xanthopoulos, et al., "The Design and Analysis of the Clock Distribution Network for a 1.2 GHz Alpha Microprocessor" 2001 IEEE International Solid-State Circuits Conference, ISSCC 2001/SESSION 25/Clock Generation and Distribution/25.6, pp. 402-403 & 330-331.

* cited by examiner

*Primary Examiner*—Chun Cao
*Assistant Examiner*—Albert Wang
(74) *Attorney, Agent, or Firm*—Oblon, Spivak, McClelland, Maier & Neustadt, P.C.

(57) ABSTRACT

It is an object to obtain a self-synchronization type block processing apparatus which does not need to optimize a clock path to be distributed to each block in a clock phase management at an upper level, and can suppress an increase in a circuit scale and can minimize an increase in a design period by circuit tuning. A local block control circuit comprises an end detecting section for receiving a plurality of complete signals, a transfer control section for generating a stop signal having a negative logic to determine whether or not a system clock is supplied to a processing block upon receipt of an end signal output from the end detecting section, the system clock and a handshaking control signal, and a logical AND gate for generating an in-block clock based on the stop signal having the negative logic which is output from the transfer control section and the system clock.

8 Claims, 8 Drawing Sheets

F I G. 4
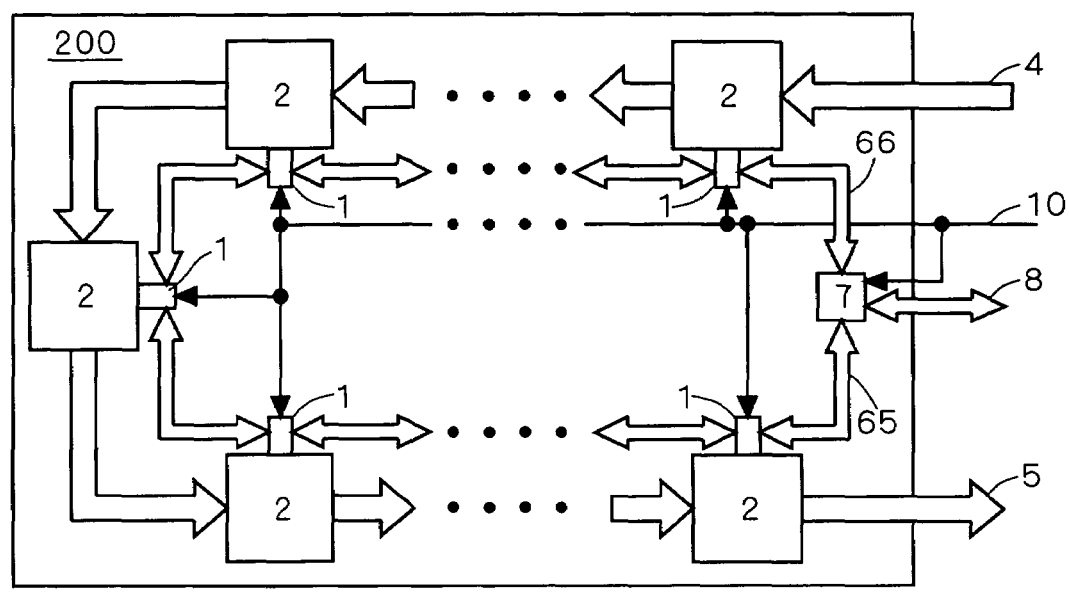
F I G. 5
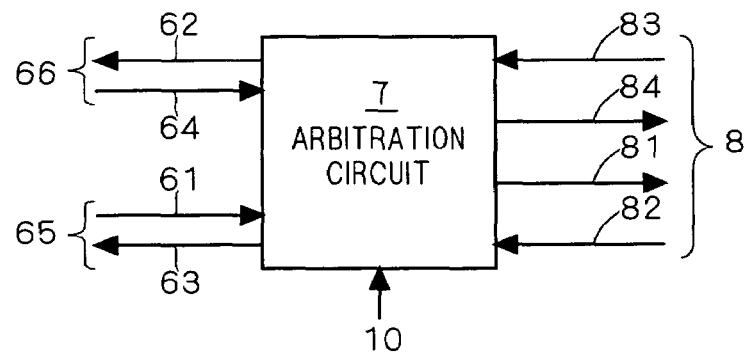

DATA PROCESSING SYSTEM WITH BLOCK CONTROL CIRCUITS USING SELF-SYNCHRONIZATION HANDSHAKING AND LOCAL CLOCK/POWER CONTROL BASED ON DETECTED COMPLETION WITHIN SUBBLOCKS

BACKGROUND OF THE INVENTION

1. Field of the Invention

The present invention relates to a data processing system, and more particularly to a data processing system for dividing an inner part into a plurality of processing blocks and controlling the processing blocks self-synchronously.

2. Description of the Background Art

A data processing system basically carries out control synchronously with a single system clock. In an apparatus for dividing the data processing system into a plurality of processing blocks to execute a whole processing, it is necessary to control a clock skew to have a specific reference value or less for a clock to be a synchronizing signal in the processing blocks and between the processing blocks.

In recent years, a physical control area has been enlarged with an increase in an operation speed and a scale of a system so that the reference value for the clock skew has been decreased. Thus, a situation has become increasingly tense and the clock skew having the reference value or less has been hard to implement.

Therefore, various methods for implementing the clock skew having the reference value or less have been described in Brian Curran et al., ISSCC 2001 Proceeding 15.5 "A1.1 GHz First 64 b Generation Z900 Microprocessor" p. 238-239, 454 (which will be hereinafter referred to as Document 1), Hidehiro TAKATA et al., IEICE on Electronics "Physical Design Methodology for On-Chip 64-Mb DRAM MPEG-2 Encoding with a Multimedia Processor) VOL. E85-C No. 2 February 2002 p. 368-374 (which will be hereinafter referred to as Document 2), Kouichi Yamaguchi et al., ISSCC 2001 Proceeding 25.4 "2.5 GHz 4-phase Clock Generator with Scalable and No Feedback Loop Architecture" p. 398-399, 326-327 (which will be hereinafter referred to as Document 3), and Thucydides Xanthopoulos et al., ISSCC 2001 Proceeding 25.6 "The Design and Analysis of the Clock Distribution Network for a 1.2 GHz Alpha Microprocessor" p. 402-403, 330-331 (which will be hereinafter referred to as Document 4).

More specifically, the Document 1 has described a method of employing a tree structure having an equal-length wiring for a clock line to be supplied to each processing block and carrying out a management for causing delay values sent from a clock generating source to each processing block to be equal to each other.

Moreover, the Document 2 has described a method of hierarchically carrying out a management based on a clock management on a block level in which a clock management area is restricted to a local area and a clock management between these blocks and adjusting a delay value by a delay adjusting circuit provided in a clock generating source in the clock management between the blocks.

The Documents 3 and 4 have described a method using a DLL (Delay Locked Loop) circuit for adjusting a clock phase between blocks in a method of hierarchically carrying out a clock management on a block level between blocks.

In these methods, the clock management is carried out in a two-stage hierarchy including an in-block (lower level) management and an interblock (an upper level) management in which an area is restricted, and "a tree structure having an equal-length wiring", "a delay value adjustment to be carried out by a delay adjusting circuit", "a clock phase adjustment to be carried out by a DLL" and the like are given to a clock management having an upper level which is harder to perform.

In the case in which supply of a clock or a power is to be stopped in order to reduce power consumption for a specific processing block, moreover, a control signal to satisfy supply stop conditions for the clock or the power is generated and the supply of the clock or the power is turned ON/OFF in response to the control signal.

As described above, in the apparatus for controlling a system synchronously with a single clock, a method of hierarchically managing a clock skew at a lower level on a block unit and an upper level between blocks has conventionally been used for a method of setting a clock skew to have a predetermined reference value or less.

While a management of a phase difference in a clock at a lower level can be implemented comparatively easily by reducing an area, a management of a phase difference in a clock at an upper level is harder to perform because an area to be managed covers a wide range. For this reason, there have been employed the techniques such as "a tree structure having an equal-length wiring", "a delay value adjustment to be carried out by a delay adjusting circuit", "a clock phase adjustment to be carried out by a DLL" and the like.

These techniques are to optimize a clock path to be distributed to each block and a great deal of labor is required for a design, a verification and an analysis.

Referring to "a delay value adjustment to be carried out by a delay adjusting circuit" and "a clock phase adjustment to be carried out by a DLL", furthermore, a delay adjusting circuit, a DLL and the like are required. Consequently, scales of the circuits are increased, and furthermore, these circuits are to be tuned up. Thus, a design period is increased.

In the case in which the supply of the clock or the power is to be stopped in order to reduce the power consumption for a specific processing block, moreover, it is necessary to generate a control signal to satisfy the supply stop conditions of the clock or the power.

SUMMARY OF THE INVENTION

It is an object of the present invention to obtain a self-synchronization type block processing apparatus which does not need to optimize a clock path to be distributed to each block in a clock phase management at an upper level, and can suppress an increase in a circuit scale and can minimize an increase in a design period by circuit tuning and to obtain a structure in which a control signal for stopping supply of a clock or a power does not need to be generated when the supply of the clock or the power is to be stopped in order to reduce power consumption for a specific processing block.

According to the present invention, a data processing system for processing data via a plurality of processing blocks includes a plurality of block control circuits provided corresponding to the respective processing blocks, the block control circuits controlling corresponding processing blocks by a clock synchronization respectively and transferring a handshaking control signal with other block control circuits, thereby controlling a data transfer between the processing blocks by self-synchronization type handshaking.

In the data processing system, the block control circuit controls the corresponding processing block by the clock synchronization. Therefore, a control range is restricted to a local area, and a management can be carried out comparatively easily even if a tolerance of a clock skew is reduced. Moreover, a data transfer between the processing blocks having the control range covering a wide range is controlled by the self-synchronization type handshaking. In a clock skew management at an upper level, therefore, a work for optimizing a clock path to be distributed to each block is not required. Consequently, a design period can be shortened and an increase in a scale of the circuit can be prevented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing a whole structure of a data processing system according to a second embodiment of the present invention, FIG. 5 is a block diagram for explaining various signals to be handled by an arbitration circuit.

DESCRIPTION OF THE PREFERRED EMBODIMENTS

A. First Embodiment

Figure 1:
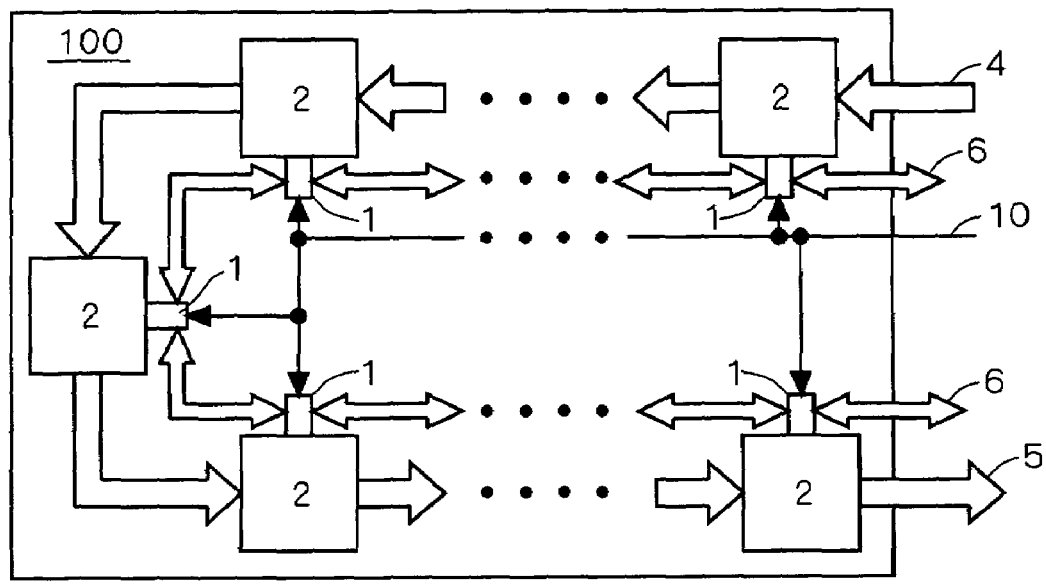
FIG. 1 is a block diagram showing a whole structure of a data processing system according to a first embodiment of the present invention.

FIG. 1 shows a structure of a data processing system 100 according to a first embodiment of the present invention.

A-1. Structure of System

As shown in FIG. 1, the data processing system 100 is divided into a plurality of processing blocks 2 and a local block control circuit 1 is attached to each of the processing blocks 2.

A system clock 10 is given from an outside of the data processing system 100 to each local block control circuit 1, and a handshaking control signal 6 is transferred between the local block control circuits 1 and a data transfer between a plurality of processing blocks 2 is controlled by self-synchronization type handshaking synchronously with the system clock 10. The self-synchronization type handshaking control implies a method of transferring data while carrying out a confirmation for each data transfer in response to control signals of Request, Acknowledge and the like.

The data processing system 100 has such a structure that input data 4 are received in any of the processing blocks 2 from the outside of the data processing system 100, and are subjected to a predetermined processing and are thus given to the next processing block 2, and finally, output data 5 are sent from any of the processing blocks 2 to the outside.

Figure 2:
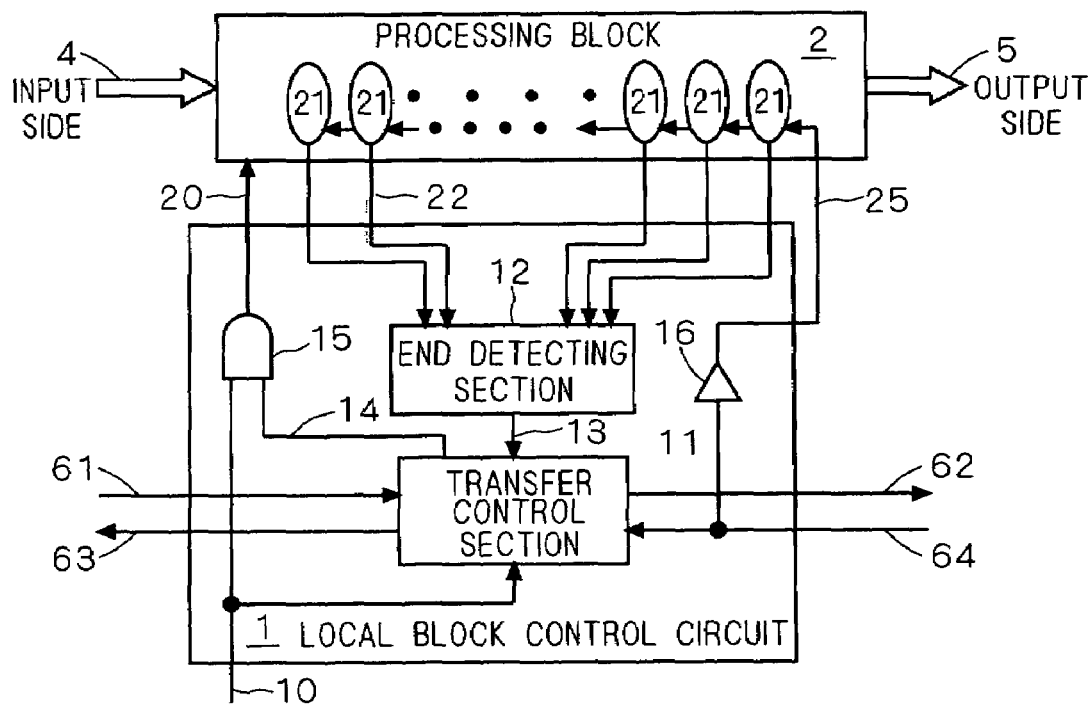
FIG. 2 is a block diagram showing a partial structure of the data processing system according to the first embodiment of the present invention.

Referring to FIG. 2, next, description will be given to structures of the local block control circuit 1 and the processing block 2 to be controlled by the control circuit 1.

As shown in FIG. 2, the processing block 2 is controlled by an in-block clock 20 (a local clock) given from the local block control circuit 1, and carries out a predetermined processing over the input data 4 and sends the output data 5. The processing block 2 is divided into a plurality of subblocks 21.

As shown in FIG. 2, all the subblocks 21 have a function of detecting an end of a processing respectively and have a function of outputting a complete signal 22 synchronously with the in-block clock 20 respectively when the processing is ended.

The complete signal 22 serves to cause the local block control circuit 1 to detect the end of the processing in the processing block 2. Referring to the subblock 21 carrying out a processing which does not influence the processing in the processing block 2 at all, therefore, the complete signal 22 does not need to be output to the local block control circuit 1.

Referring to the subblock 21 described above, furthermore, in the case in which the complete signal 22 is used for only the detection of the end, it does not need to be generated.

Referring to the subblock 21 which is always operated, moreover, it is apparent that the complete signal 22 does not need to be generated.

A circuit scale of the processing block 2 is supposed to be set within a physical area in which a clock skew management of the in-block clock 20 can easily be carried out when the in-block clock 20 is to be distributed into the processing block 2. More specifically, a standard for the clock skew management is generally set to be 5% of a cycle or less. Accordingly, in the case in which an operating frequency of 5 GHz is supposed, for example, a cycle is set to be 200 pSEC and the standard for the clock skew management is set to be 10 pSEC, which is equal to the number of transistors of approximately 1000. If a speed is increased, the circuit scale of the processing block 2 is reduced.

The local block control circuit 1 includes an end detecting section 12 for receiving a plurality of complete signals 22 output from the processing block 2, a transfer control section 11 for generating a stop signal 14 having a negative logic to determine whether or not the system clock 10 is supplied to the processing block 2 upon receipt of an end signal 13 output from the end detecting section 12, the system clock 10 and the handshaking control signal 6, a logical AND gate 15 for generating the in-block clock 20 based on the stop signal 14 having the negative logic which is output from the transfer control section 11 and the system clock 10, and a driver 16 for driving an output side request acknowledge signal 64 to be one of the handshaking control signals 6 and giving a reset signal 25 having a negative logic to the processing block 2.

The logical AND gate 15 controls whether or not the system clock 10 is sent as the in-block clock 20 to the processing block 2 based on the stop signal 14 having the negative logic, and fixes a value of the in-block clock 20 (to zero in the present embodiment) if the system clock 10 is not given. Therefore, gate means having the same function is not restricted to the logical AND gate but a transfer gate (a transmission gate) or the like may be used.

A-2. Operation of System

Referring to FIGS. 1 and 2, description will be given to an example of a data transfer operation based on self-synchronization type handshaking to be carried out by the local block control circuit 1 with reference to a timing chart of FIG. 3.

Taking note of a specific processing block 2, the handshaking control signal 6 includes an output side transfer request signal 62 for giving a request that data are to be transferred to the local block control circuit 1 attached to a processing block 2 in a latter stage for giving the output data 5 of the specific processing block 2 or other external systems (hereinafter referred to as an output side), the output side request acknowledge signal 64 having the negative logic given from the output side and indicating that a data transfer request is acknowledged, an input side transfer request signal 61 given from the local block control circuit 1 attached to the processing block 2 in a former stage for giving the input data 4 to the specific processing block 2 or other external systems (hereinafter referred to as an input side) and indicating that there is a request for transferring data from the input side, and an input side request acknowledge signal 63 having a negative logic indicating that the data transfer request given from the input side is acknowledged.

Figure 3:
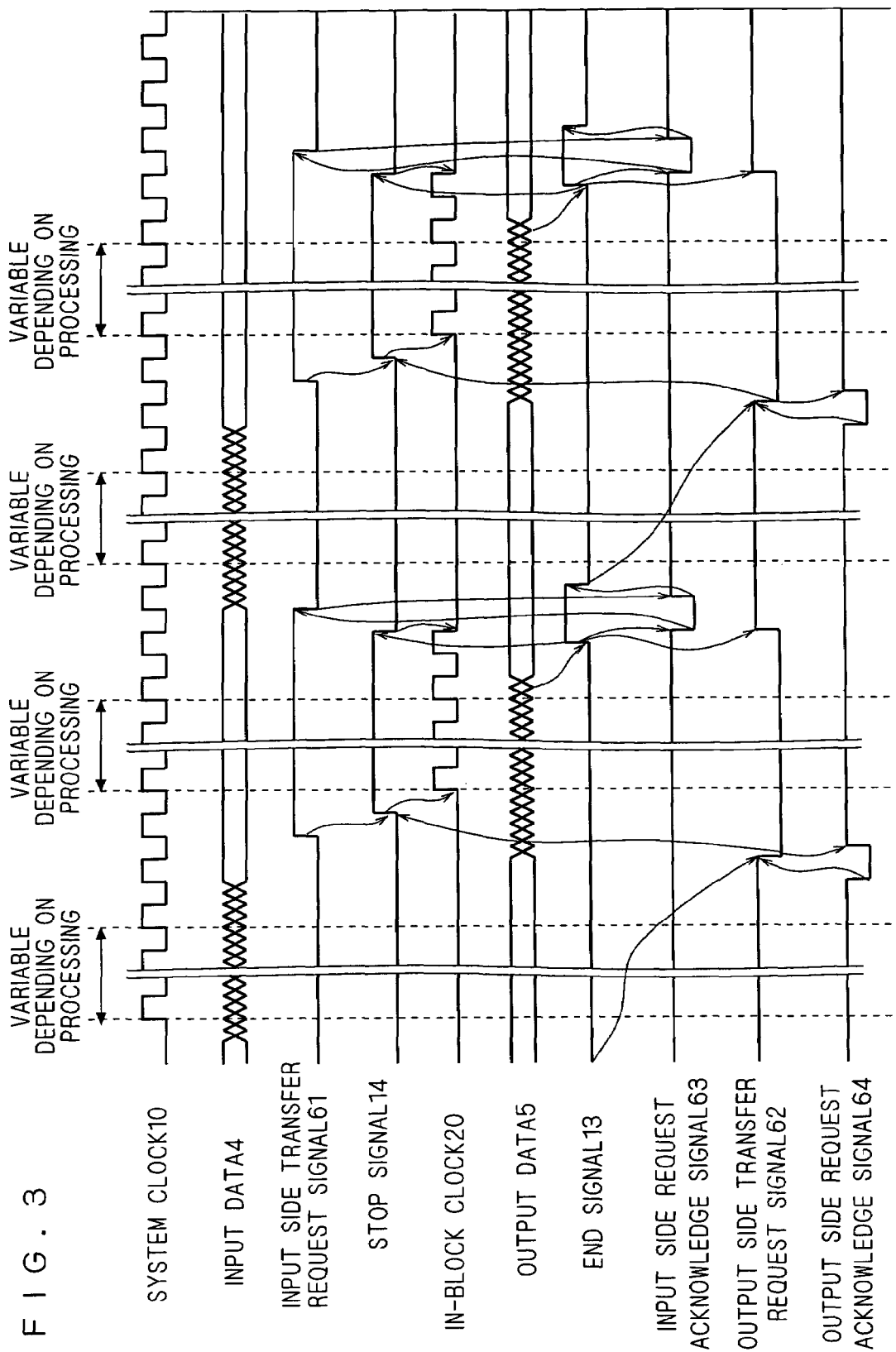
FIG. 3 is a timing chart for explaining an operation of the data processing system according to the first embodiment of the present invention.

As shown in FIG. 3, when the input data 4 are given and the input side transfer request signal 61 sent from the input side is then asserted (0→1), a data transfer to the output side is completed if the output side transfer request signal 62 is set in a negate state (0). Therefore, the transfer control section 11 resets (0→1) the stop signal 14 having the negative logic in a fall timing of the system clock 10.

Consequently, the system clock 10 is supplied as the in-block clock 20 to the processing block 2 through the logical AND gate 15 and a predetermined processing is started for the input data 4 in the processing block 2. The in-block clock 20 has such a structure that a necessary number of pulses are given depending on a processing as will be described below. The number of pulses is variable.

A processing in each subblock 21 of the processing block 2 is sequentially ended corresponding to a progress of a processing in the processing block 2 (after a time required for the processing passes), and the complete signal 22 is asserted (0→1) synchronously with the in-block clock 20 in the subblock 21 in which the processing is ended.

The complete signal 22 is sequentially sent to the end detecting section 12, and the end detecting section 12 asserts (0→1) the end signal 13 when detecting the assertion of all the complete signals 22.

The transfer control section 11 asserts (1→0) the stop signal 14 having the negative logic in the fall timing of the system clock 10 upon receipt of the assertion of the end signal 13, asserts (1→0) the input side request acknowledge signal 63 having the negative logic to be given to the input side and indicates that the data transfer request sent from the input side is acknowledged, and asserts (0→1) the output side transfer request signal 62 to be sent to the output side and gives a request for transferring data to the output side.

By this operation, the supply of the system clock 10 to the processing block 2 through the logical AND gate 15 is stopped so that the processing of the processing block 2 is halted.

Moreover, the input side request acknowledge signal 63 having the negative logic to be given to the input side is asserted (1→0) so that the input side transfer request signal 61 to be given from the input side is negated (1→0) and an output of data is held (in the processing block 2) at the input side.

The transfer control section 11 resets (0→1) the input side request acknowledge signal 63 having the negative logic upon receipt of the negation of the input side transfer request signal 61, and furthermore, negates (1→0) the end signal 13 in the fall timing of the system clock 10.

When a predetermined processing is executed (in the processing block 2) at the output side and the output side request acknowledge signal 64 having the negative logic which is sent from (the local block control circuit 1 on) the output side is asserted (1→0), the data transfer to the output side is completed if the end signal 13 is set in the negate state (0). Therefore, the transfer control section 11 resets (1→0) the output side transfer request signal 62 in the fall timing of the system clock 10. The output side (the local block control circuit 1) receiving the reset negates (0→1) the output side request acknowledge signal 64.

A pulse signal of the output side request acknowledge signal 64 having the negative logic is driven by the driver 16 and is distributed as a reset signal 25 having a negative logic to all the subblocks 21 in the processing block 2 which are to be reset. Consequently, the complete signal 22 is reset (1→0) so that a serial data transfer based on the self-synchronization type handshaking to be carried out by the transfer control section 11 is completed.

The complete signal 22 to be an output signal sent from the processing block 2 and the end signal 13 based thereon are synchronous with the system clock 10 (that is, the in-block clock 20). It is desirable that the stop signal 14 having the negative logic should also be synchronous with the system clock 10 (the fall in the foregoing). The reason is that the in-block clock 20 is to be prevented from generating a beard-shaped erroneous pulse when the system clock 10 is to be gated by the logical AND gate 15.

A-3. Effect

As described above, in the data processing system 100, the inner part is divided into a plurality of processing blocks 2 to restrict the control range to the local area, and the management in the processing block 2 (the lower level management) is synchronously controlled by the in-block clock 20 to be the local clock. The management (the upper level management) between the processing blocks 2 having the control range covering a wide area employs the self-synchronization type handshaking control to be carried out by the local block control circuit 1.

In the case in which the clock synchronous control is to be used, a tolerance of a clock skew (a shift of a clock phase) is reduced with an increase in a speed so that the management is hard to perform. In addition, since a physical area to be controlled is large, the clock skew management becomes increasingly hard to perform. By employing the structure described above, however, the control range for each of the processing blocks 2 is restricted to the local area. Consequently, the management can be carried out comparatively easily even if the tolerance of the clock skew is reduced.

In the local block control circuit 1, moreover, information about a processing state of the processing block 2 is acquired and the supply of the in-block clock 20 to the processing block 2 and the stop thereof are controlled corresponding to the processing state of the processing block 2 by the same information and the system clock 10, and the stop signal 14 having the negative logic which is generated based on the handshaking control signal 6. Consequently, it is not necessary to provide a complicated circuit for controlling a clock which has conventionally been required. Thus, a design period can be shortened and an increase in a circuit scale can be suppressed.

Referring to the control between the processing blocks 2 having the control range covering a wide range, moreover, the self-synchronization type handshaking control to be carried out by the local block control circuit 1 is employed. In the clock skew management at the upper level, consequently, a work for optimizing a clock path to be distributed to each block is not required. Thus, a design period can be shortened and an increase in a circuit scale can be suppressed.

B. Second Embodiment

FIG. 4 shows a structure of a data processing system 200 according to a second embodiment of the present invention. The same structures as those of the data processing system 100 shown in FIG. 1 have the same reference numerals and repetitive description will be omitted.

B-1. Structure of System

As shown in FIG. 4, the data processing system 200 further comprises an arbitration circuit 7 for interfacing with other external systems in addition to the structure of the data processing system 100 described with reference to FIG. 1.

The arbitration circuit 7 is an interface circuit for transmitting and receiving data between the data processing system 200 and other systems based on a system control signal 8 which is synchronized with a system clock 10.

Taking note of a specific processing block 2, an output side transfer request signal 62 indicative of a request for transferring data to a local block control circuit 1 attached to a processing block 2 in a latter stage for giving output data 5 or other external systems (hereinafter referred to as an output side) and an output side request acknowledge signal 64 having a negative logic which is given from the output side and indicates that the data transfer request is acknowledged will be generally referred to as an output side handshaking control signal 66.

Moreover, an input side transfer request signal 61 given from the local block control circuit 1 attached to the processing block 2 in a former stage for giving input data 4 to the specific processing block 2 or other external systems (hereinafter referred to as an input side) and indicating that a request for transferring data from the input side is given from the input side and an input side request acknowledge signal 63 having a negative logic which indicates that the data transfer request given from the input side is acknowledged will be generally referred to as an input side handshaking control signal 65.

As shown in FIG. 4, the arbitration circuit 7 is constituted to transfer a predetermined system control signal 8 with other external systems (not shown), to create the input side handshaking control signal 65 and the output side handshaking control signal 66 based on the system control signal 8 and to send them to the local block control circuit 1 in the data processing system 200.

FIG. 5 shows the details of the input side handshaking control signal 65, the output side handshaking control signal 66 and the system control signal 8 which are to be sent to the arbitration circuit 7.

As shown in FIG. 5, the system control signal 8 is constituted by a bus request signal 81 indicating a request for the data processing system 200 to output data to other external systems, a bus request acknowledge signal 82 sent from the other external systems receiving the bus request signal 81 and indicating that the bus request is acknowledged, a bus end signal 83 sent from the other external systems and indicating that an input of data to the data processing system 200 is completed, and a bus read/write signal 84 indicative of a state of a data input/output which is output from the data processing system 200.

B-2. Operation of System

Since a data transfer operation and handshaking control in the data processing system 200 are the same as those in the data processing system 100, description will be omitted and only an operation of the arbitration circuit 7 will be described by using a timing chart of FIG. 6 with reference to FIGS. 4 and 5.

Figure 6:
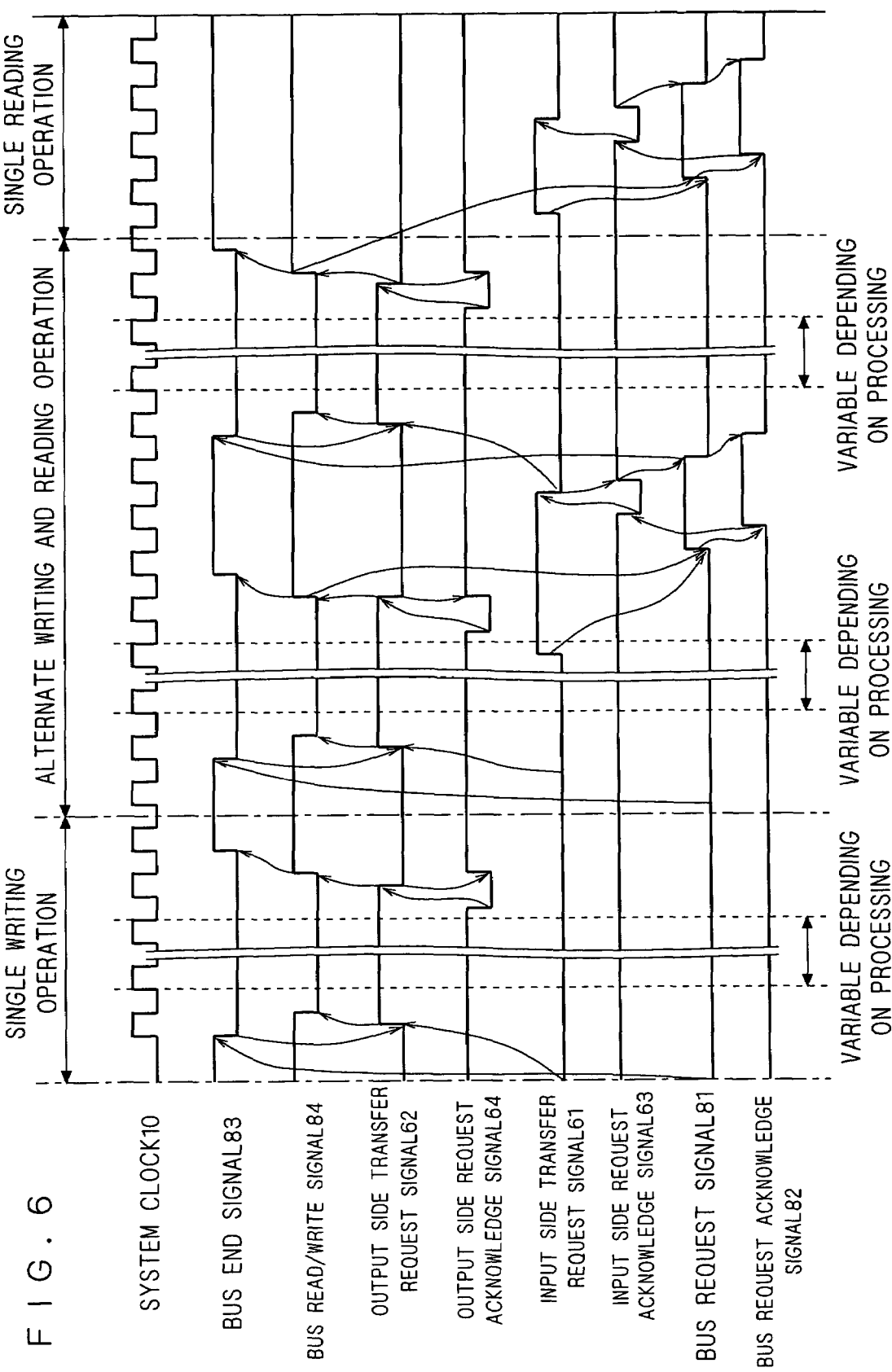
FIG. 6 is a timing chart for explaining an operation of the arbitration circuit.

As shown in FIG. 6, in the system control signal 8, the bus request acknowledge signal 82 and the bus end signal 83 to be input to the data processing system 200 are changed synchronously with a rise in the system clock 10 and the output bus request signal 81 and the bus read/write signal 84 to be output to the data processing system 200 are changed synchronously with a fall of the system clock 10.

On the other hand, the input side handshaking signal 65 and the output side handshaking signal 66 are changed asynchronously with the system clock 10.

B-2-1. Single Writing Operation

First of all, description will be given to a single writing operation to the data processing system 200 (a first half part of the timing chart shown in FIG. 6).

When the bus request signal 81 is set in a negate state (0) and the bus end signal 83 sent from an outside of the data processing system 200 is negated (1→0), the output side transfer request signal 62 indicative of a request for transferring data is asserted (0→1) because the input side transfer request signal 61 is set in a negate state (0) and a request for transferring data is not given from the input side, that is, the local block control circuit 1 attached to a processing block 2 in a final stage in the data processing system 200, and the bus read/write signal 84 is set to be 0 in the fall timing of the system clock 10 to bring an outside of the data processing system 200 into a writing state.

Data are written to the data processing system 200 for a period in which the bus read/write signal 84 is maintained to be 0. It is possible to optionally vary the same period depending on a processing by changing the number of pulses of the system clock 10.

The processing in the processing block 2 on the output side is completed so that the output side request acknowledge signal 64 having the negative logic is asserted (1→0) from the local block control circuit 1 attached to the processing block 2 to negate (1→0) the output side transfer request signal 62 and to set the bus read/write signal 84 to be 1, thereby bringing the outside of the data processing system 200 into a reading state.

Consequently, the output side request acknowledge signal 64 having the negative logic which is sent from the output side is negated (0→1) and the other external systems of the data processing system 200 assert (0→1) the bus end signal 83 upon receipt of a change into the reading state. Thus, a serial writing operation is ended.

B-2-2. Single Reading Operation

Next, description will be given to a single reading operation to the data processing system 200 (a second half part of the timing chart shown in FIG. 6).

In the case in which the bus read/write signal 84 is set in a reading state (1), the bus request signal 81 to be sent to the other external systems of the data processing system 200 is asserted (0→1) to give a request for outputting data when the input side transfer request signal 61 sent from the input side, that is, the local block control circuit 1 attached to the processing block 2 in the final stage in the data processing system 200 is asserted (0→1).

For the assertion of the bus request signal 81, the other external systems of the data processing system 200 assert (0→1) the bus request acknowledge signal 82, thereby indicating that the bus request is acknowledged. Upon receipt of the assertion, the arbitration circuit 7 asserts (1→0) the input side request acknowledge signal 63 having the negative logic which is to be sent to the local block control circuit 1 attached to the processing block 2 in the final stage.

For the assertion of the input side request acknowledge signal 63 having the negative logic, the input side transfer request signal 61 sent from the local block control circuit 1 attached to the processing block 2 in the final stage is negated (1→0). Upon receipt of the negation, the arbitration circuit 7 negates (0→1) the input side request acknowledge signal 63 having the negative logic which is to be sent to the local block control circuit 1 and negates (1→0) the bus request signal 81 to the outside of the data processing system 200.

The bus request signal 81 is negated so that the bus request acknowledge signal 82 sent from the other external systems of the data processing system 200 is negated (1→0). Thus, a serial reading operation is completed.

B-2-3. Alternate Writing-Reading Operation

Next, description will be given to an alternate writing and reading operation to/from the data processing system 200 (a middle part of the timing chart shown in FIG. 6).

In the case in which the input side transfer request signal 61 sent from the input side, that is, the local block control circuit 1 attached to the processing block 2 in the final stage in the data processing system 200 is asserted (0→1) (a request for outputting data from the input side is given) during the single writing operation described above, the bus request signal 81 to be sent to the outside is maintained in the negate state (0) for a predetermined period and a reading operation is held for a predetermined period because the bus read/write signal 84 is set in a writing state (0).

After a change into a reading state (1) for the bus read/write signal 84 is received, the bus request signal 81 to be sent to the outside is asserted (0→1) in the fall timing of the system clock 10. Thus, a serial reading operation is started.

In this case, the reading operation is also similar to the single reading operation described above.

When a writing request is given from the other external systems of the data processing system 200 during the reading operation, the bus end signal 83 is maintained in an assertion state (1) and the writing operation is held in the other external systems of the data processing system 200 because the bus request signal 81 is set in the assertion state (1).

After the predetermined reading operation is ended, the bus request signal 81 to be sent to the other external systems of the data processing system 200 is negated (1→0) so that the bus end signal 83 sent from the other external systems of the data processing system 200 is negated (1→0). Thus, a serial writing operation is started.

Also in this case, the writing operation is similar to the single writing operation described above.

B-3. Effect

As described above, in the data processing system 200, the arbitration circuit 7 is provided as an interface circuit with the other external systems and the system control signal 8 which is synchronous with the system clock 10 is used for a control signal to be directly transferred with the other external systems. Therefore, it is possible to carry out, without a hindrance, an interface with other systems for a clock synchronization, for example, a synchronizing system using self-synchronization control and asynchronous control which have conventionally been used, for example.

C. First Variant

In the data processing systems 100 and 200 according to the first and second embodiments described above, the processing block 2 has such a structure that the inner part thereof is divided into a plurality of subblocks 21 as shown in FIG. 2.

Figure 7:
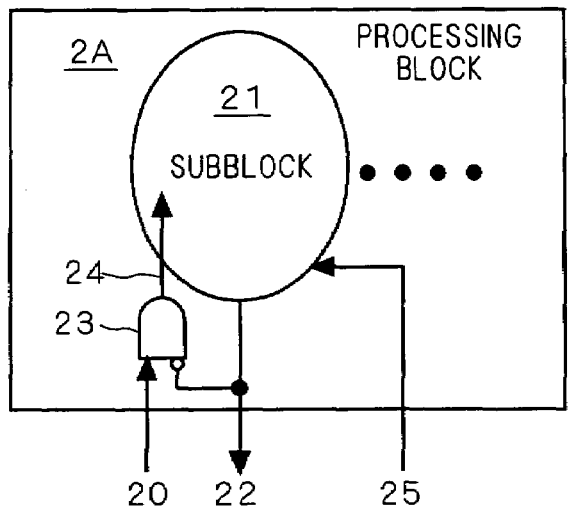
FIG. 7 is a block diagram showing a structure according to a first variant of the present invention.

While the in-block clock 20 is given to all the subblocks 21 and the complete signal 22 is output synchronously with the in-block clock 20, the complete signal 22 output from the subblocks 21 may be used to gate the in-block clock 20 sent from the local block control circuit 1 and an original in-subblock clock 24 may be used in the subblocks 21 as in a processing block 2A shown in FIG. 7.

More specifically, as shown in FIG. 7, a logical AND gate 23 is attached to the subblock 21 to have such a structure that the complete signal 22 output from the subblock 21 is input to an inversion input terminal of the logical AND gate 23 and the in-block clock 20 is input from the local block control circuit 1 to an input terminal of the logical AND gate 23. The output 24 of the logical AND gate 23 is sent to the subblock 21.

By employing such a structure, the in-block clock 20 is gated by the logical AND gate 23 and is changed into the in-subblock clock 24. The subblock 21 is controlled by using the in-subblock clock 24. Consequently, power consumption can be controlled more finely.

More specifically, if the in-block clock 20 is continuously supplied to the subblock 21 completing the processing and outputting the complete signal 22, the power consumption is increased. For this reason, it is desirable that the supply of the in-block clock 20 to the subblock 21 outputting the complete signal 22 should be stopped.

The logical AND gate 23 is operated to gate the in-block clock 20 and to stop the supply thereof to the subblock 21 completing a predetermined processing and outputting the complete signal 22, and to give the in-block clock 20 as the in-subblock clock 24 if the complete signal 22 has not been output.

Since the in-block clock 20 is not supplied to the subblock 21 outputting the complete signal 22, accordingly, the power consumption can be correspondingly reduced.

In the same manner as the stop signal 14 having the negative logic, moreover, it is preferable that the existing complete signal 22 should be used to generate the in-subblock clock 24. Consequently, a complicated circuit for controlling a clock or the like is not required. Thus, a design period can be shortened and an increase in a circuit scale can be prevented.

There is also provided a function of fixing a value of the in-subblock clock 24 (to 0 in the present embodiment) if the in-block clock 20 is not supplied.

The logical AND gate 23 does not need to be connected to all the subblocks 21 constituting the processing block 2A. For example, the in-block clock 20 may be directly supplied to the subblock 21 which is to be always operated and the subblock 21 which has a small scale and produces a small effect of reducing the power consumption even if the in-subblock clock 24 is stopped after the operation is completed, for example.

The logical AND gate 23 controls the supply of the in-block clock 20 as the in-subblock clock 24 to the subblock 21 based on the complete signal 22. If the in-subblock clock 24 is not supplied, the value of the in-subblock clock 24 is fixed. Therefore, any gate means having the same function is not restricted to the logical AND gate but a transfer gate (a transmission gate) or the like may be used.

D. Second Variant

Figure 8:
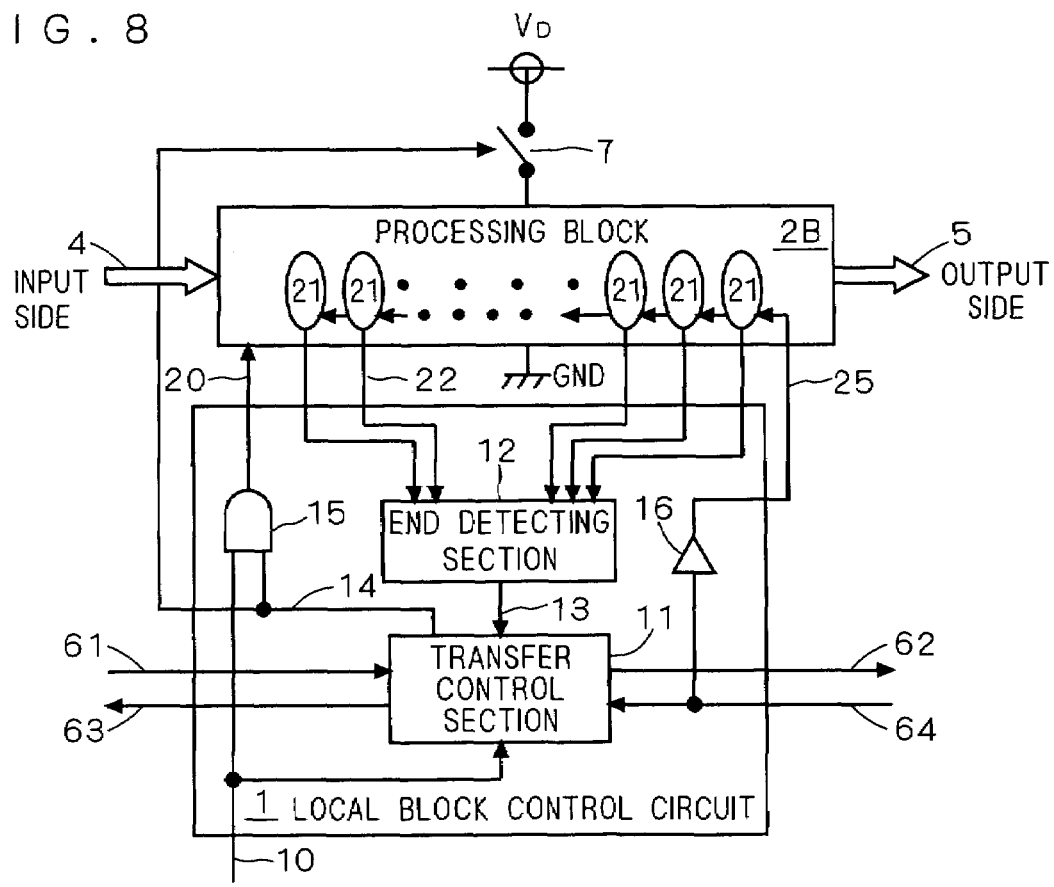
FIGS. 8 and 9 are block diagrams showing a structure according to a second variant of the present invention.

In respect of a further reduction in power consumption, a switch 7 may be provided on a supply line for a power $V_D$ and may be ON/OFF controlled based on a stop signal 14 having a negative logic as in a processing block 2B shown in FIG. 8.

More specifically, when assertion of all complete signals 22 is detected by an end detecting section 12, an end signal 13 is asserted so that the stop signal 14 is asserted (1→0). If the switch 7 is constituted to be brought into an OFF state at this time, supply of a power to the processing block 2B is stopped so that power consumption in the processing block 2B can be reduced.

When the stop signal 14 is set in a reset state (1), the switch 7 is brought into an ON state and the power is supplied to the processing block 2B.

Thus, a current source of the processing block 2B can be perfectly broken by turning ON/OFF a power source on a processing block unit in response to the stop signal 14 having the negative logic. In the case in which an operation of the processing block 2B is not required, consequently, the power consumption can be perfectly eliminated so that the effect of reducing the power consumption can be increased.

Moreover, it is preferable that the stop signal 14 having the negative logic should be used as a control signal for obtaining a great power saving effect. Consequently, a complicated circuit for obtaining the control signal or the like is not required. Thus, a design period can be shortened and an increase in a circuit scale can be prevented.

Furthermore, the structure in FIG. 8 is basically the same as that of the data processing system 100 described with reference to FIG. 2. During the operation of the processing block 2B, the clock control is carried out on the subblock 21 unit based on the complete signal 22. During the operation of the processing block 2B, therefore, the power consumption is reduced. The power saving is carried out by clock control on the subblock 21 unit during a processing of the processing block 2B and is carried out by power control on a processing block unit after the processing of the processing block 2B is ended. Thus, the power saving in two stages is carried out. Consequently, a power saving effect can be more increased.

Figure 9:
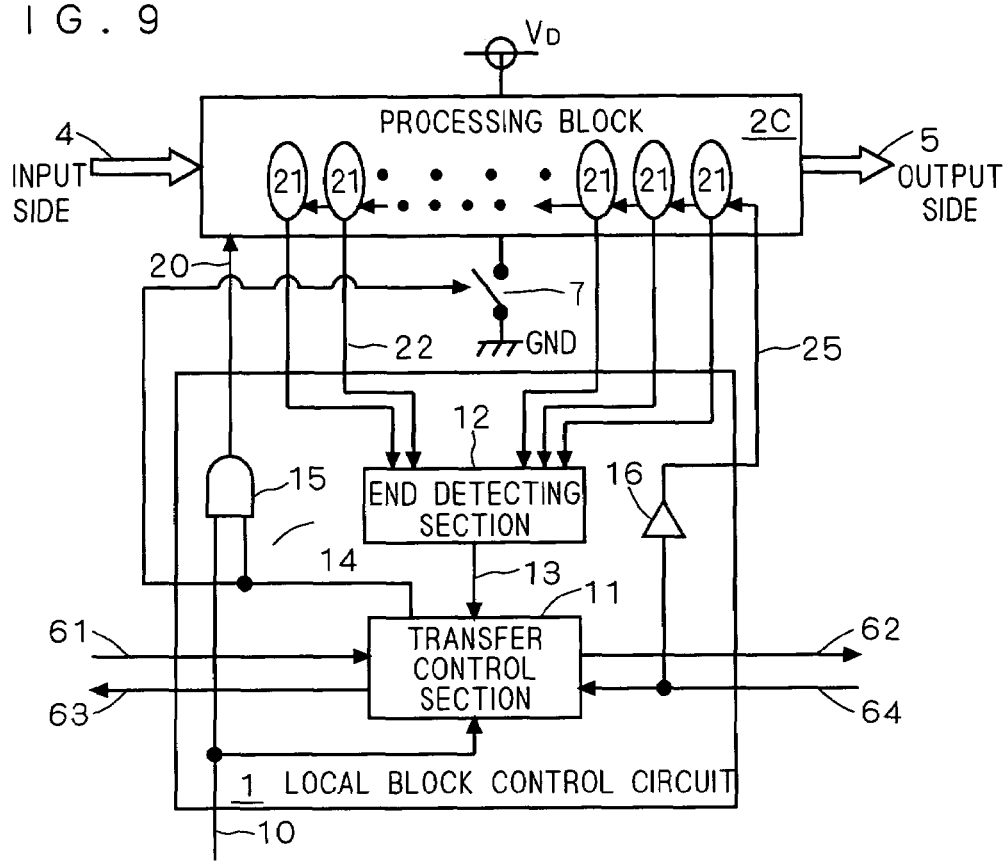

In respect of the power control on the processing block unit, the switch 7 may be provided on a ground (GND) line and may be ON/OFF controlled based on the stop signal 14 having the negative logic as in a processing block 2C shown in FIG. 9.

Also in this case, if the switch 7 is brought into an OFF state, supply of a power to the processing block 2C is stopped. Thus, power consumption in the processing block 2C can be reduced.

E. Third Variant

Figure 10:
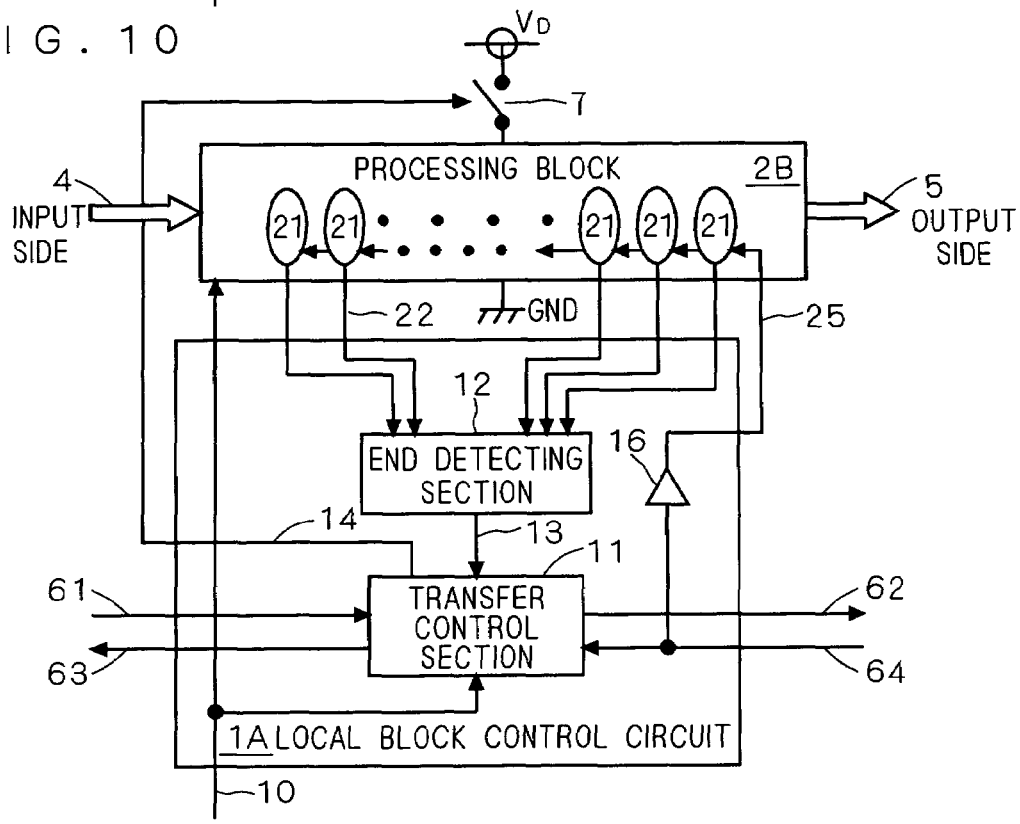
FIGS. 10 to 13 are block diagrams showing a structure according to a third variant of the present invention.
Figure 11:
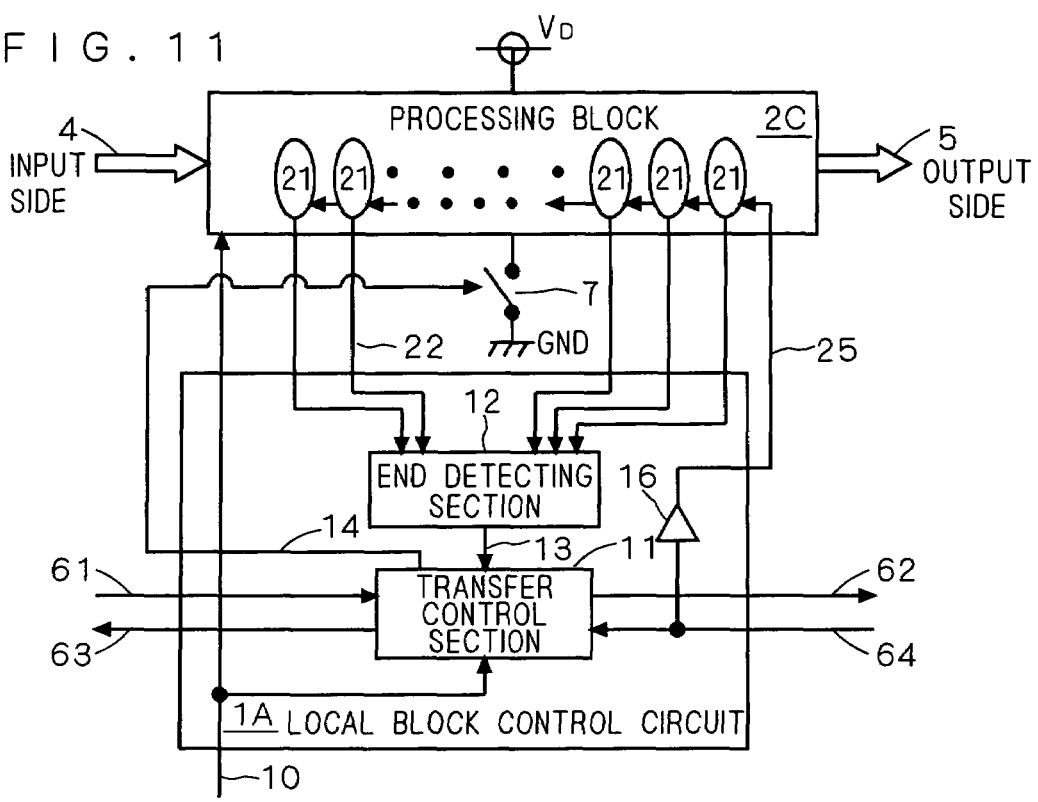

While the in-block clock 20 is given to the processing blocks 2B and 2C in the structures shown in FIGS. 8 and 9, moreover, a system clock 10 may be directly given as an in-block clock in a local block control circuit 1A shown in FIGS. 10 and 11.

More specifically, as shown in FIGS. 8 and 9, a supply of the in-block clock 20 and that of a power are controlled by the same stop signal 14 having the negative logic. During the stop of the in-block clock 20, therefore, the supply of the power is also stopped. Thus, a power saving effect can be obtained irrespective of the control of the in-block clock 20. In other words, the effect of reducing power consumption which is produced by the power control is greater than that produced by the clock control. Therefore, it is apparent that the clock control does not need to be executed.

Furthermore, if the clock control is not carried out, a logical AND gate 15 for gating the system clock 10 is not required. Consequently, a reduction in a circuit can be realized.

F. Fourth Variant

Figure 12:
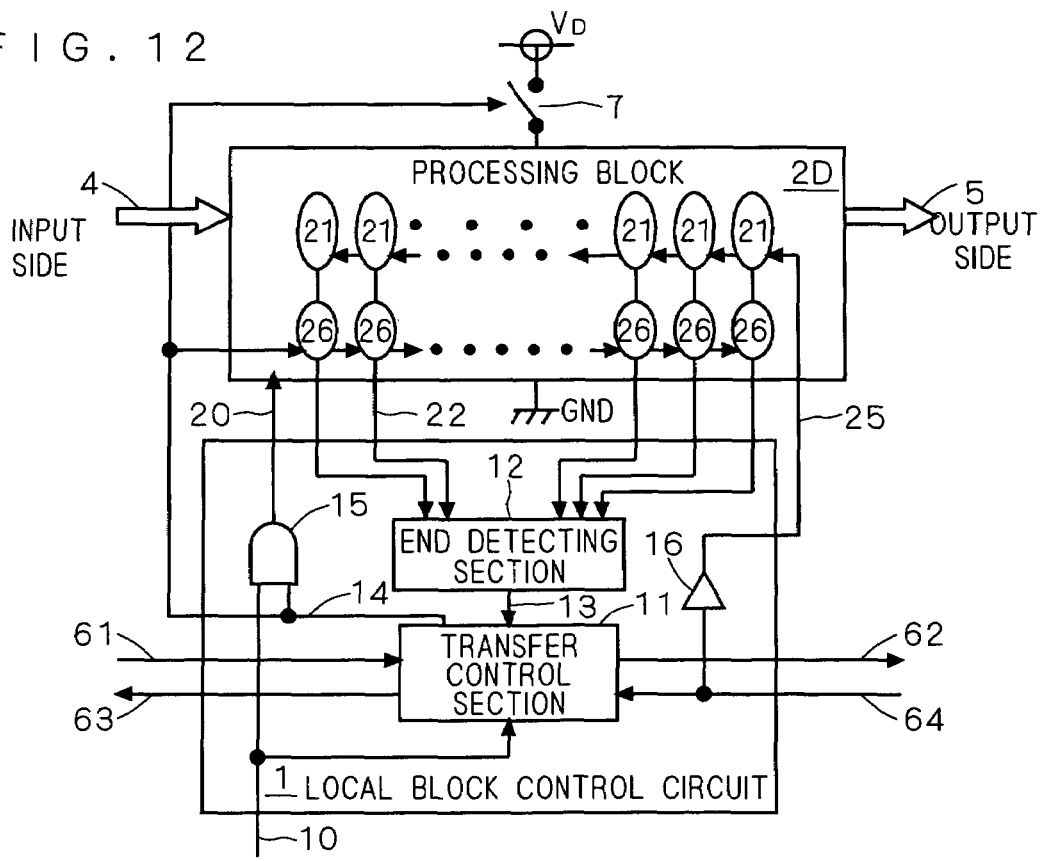

In the structures described with reference to FIGS. 8 to 11, the switch 7 is provided on the power supply line or the ground line and the ON/OFF control of the switch 7 is carried out based on the stop signal 14 having the negative logic. As in a processing block 2D shown in FIG. 12, a signal fixing circuit 26 may be connected to all subblocks 21 for outputting a complete signal 22 and an electric potential of the complete signal 22 may be fixed to "complete", that is, "1" by the signal fixing circuit 26 when the switch 7 is disconnected (OFF) in response to the stop signal 14.

When a power source of the processing block is disconnected by the switch 7, thus, the electric potential of the complete signal 22 is fixed to a definite value, for example, "1". Consequently, a malfunction of an end detecting section 12 can be prevented and a through current can be prevented from being generated by an input of an undefined signal in the end detecting section 12.

Figure 13:
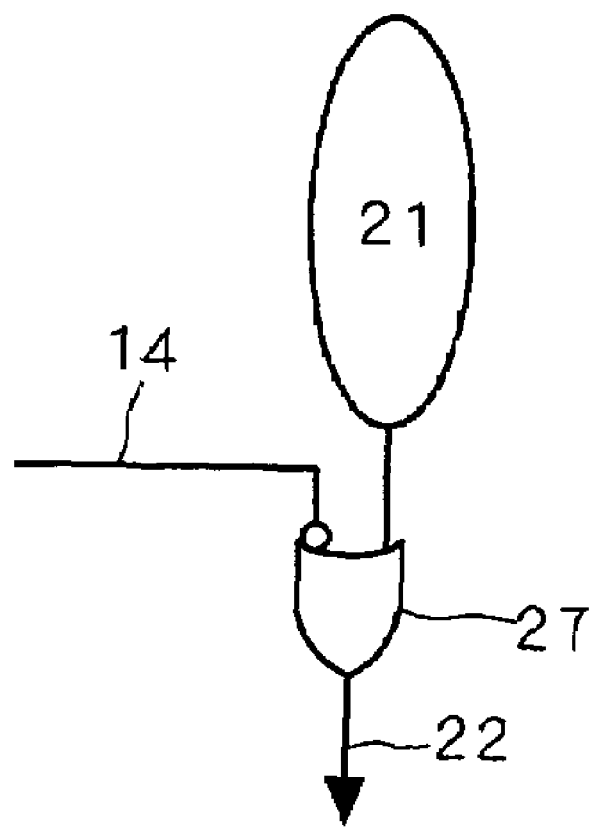

For a structure of the signal fixing circuit 26, for example, it is preferable to employ a structure shown in FIG. 13. More specifically, the signal fixing circuit 26 uses a logical OR gate 27 in which one of inputs has a negative logic, and sends the stop signal 14 to the input having the negative logic of the logical OR gate 27 and sends a signal output from the subblock 21 to the other input. Moreover, any gate means having the same function is not restricted to the logical OR gate but a transfer gate (a transmission gate) or the like may be used.

While the switch 7 is provided on the power line in the processing block 2D described above, moreover, the present invention can also be applied to a structure in which the switch 7 is provided on the ground line.

The data processing system according to the present invention described above can be applied to a microprocessor, particularly, a microprocessor for an image processing and a microprocessor for a communication. Moreover, the data processing system 100 shown in FIG. 1 and the data processing system 200 shown in FIG. 4 can constitute a single chip as an LSI respectively, and furthermore, can have such a structure that a plurality of data processing systems are provided on one chip.

While the invention has been shown and described in detail, the foregoing description is in all aspects illustrative and not restrictive. It is therefore understood that numerous modifications and variations can be devised without departing from the scope of the invention.

What is claimed is:

1. A data processing system for processing data via a plurality of processing blocks, comprising:
   a plurality of block control circuits provided corresponding to said respective processing blocks,
   said block control circuits controlling corresponding processing blocks by a clock synchronization respectively and transferring a handshaking control signal with other block control circuits, thereby controlling a data transfer between said processing blocks by self-synchronization type handshaking,
   wherein each said processing block has a plurality of subblocks and said data are processed via said plurality of subblocks,
   at least one of said plurality of subblocks outputs a complete signal indicating that a data processing is completed, and each of said plurality of block control circuits has:
   an end detecting section for detecting an end of a data processing in a corresponding one of said processing blocks upon receipt of said complete signal output from said at least one of said plurality of subblocks; and
   a transfer control section for receiving a detection result signal output from said end detecting section to control supply and stop of a clock for a corresponding one of said processing blocks in response to a stop signal created based on said detection result signal and for transferring said handshaking control signal to control a data transfer between said plurality of processing blocks by self-synchronization type handshaking.

2. The data processing system according to claim 1, wherein any of said plurality of subblocks which outputs said complete signal has gate means for controlling said supply and stop of said clock given thereto based on said complete signal output therefrom.

3. The data processing system according to claim 1, wherein each of said plurality of processing blocks includes a switch inserted through a power supply line, said switch being ON/OFF controlled based on said stop signal.

4. The data processing system according to claim 1, wherein each of said plurality of processing blocks includes a switch inserted through a ground line, said switch being ON/OFF controlled based on said stop signal.

5. A data processing system for processing data via a plurality of processing blocks, comprising:
   a plurality of block control circuits provided corresponding to said respective processing blocks,
   said block control circuits controlling corresponding processing blocks by a clock synchronization respectively and transferring a handshaking control signal with other block control circuits, thereby controlling a data transfer between said processing blocks by self-synchronization type handshaking,
   wherein each said processing block has a plurality of subblocks and said data are processed via said plurality of subblocks,
   at least one of said plurality of subblocks outputs a complete signal indicating that a data processing is completed,
   each of said plurality of block control circuits has:
     an end detecting section for detecting an end of a data processing in a corresponding one of said processing blocks upon receipt of said complete signal output from said at least one of said plurality of subblocks; and
     a transfer control section for receiving a detection result signal output from said end detecting section to create a stop signal based on said detection result signal and for transferring said handshaking control signal to control a data transfer between said plurality of processing blocks by self-synchronization type handshaking, and
   each of said plurality of processing blocks includes a switch inserted through a power supply line, said switch being ON/OFF controlled based on said stop signal.

6. The data processing system according to claim 5, wherein each of said plurality of processing blocks further includes a signal fixing section being connected to said subblock for outputting said complete signal, receiving said complete signal and said stop signal, and fixing an electric potential of said complete signal to a predetermined electric potential when bringing said switch into an OFF state.

7. A data processing system for processing data via a plurality of processing blocks, comprising:
   a plurality of block control circuits provided corresponding to said respective processing blocks,
   said block control circuits controlling corresponding processing blocks by a clock synchronization respectively and transferring a handshaking control signal with other block control circuits, thereby controlling a data transfer between said processing blocks by self-synchronization type handshaking,
   wherein each said processing block has a plurality of subblocks and said data are processed via said plurality of subblocks,
   at least one of said plurality of subblocks outputs a complete signal indicating that a data processing is completed,
   each of said plurality of block control circuits has:
     an end detecting section for detecting an end of a data processing in a corresponding one of said processing blocks upon receipt of said complete signal output from said at least one of said plurality of subblocks; and
     a transfer control section for receiving a detection result signal output from said end detecting section to create a stop signal based on said detection result signal and for transferring said handshaking control signal to control a data transfer between said plurality of processing blocks by self-synchronization type handshaking, and
   each of said plurality of processing blocks includes a switch inserted through a ground line, said switch being ON/OFF controlled based on said stop signal.

8. The data processing system according to claim 7, wherein each of said plurality of processing blocks further includes a signal fixing section being connected to said subblock for outputting said complete signal, receiving said complete signal and said stop signal, and fixing an electric potential of said complete signal to a predetermined electric potential when bringing said switch into an OFF state.

* * * * *